UNITED STATES PATENT OFFICE.

GILBERT THOMAS MORGAN, OF LONDON, ENGLAND.

PROCESS FOR THE MANUFACTURE OF PARA-AMINO-N-METHYLFORMANILID.

1,273,901. Specification of Letters Patent. Patented July 30, 1918.

No Drawing. Application filed January 31, 1917. Serial No. 145,644.

*To all whom it may concern:*

Be it known that I, GILBERT THOMAS MORGAN, professor of chemistry, of the City and Guilds Technical College, Leonard street, City Road, London, England, a subject of the King of Great Britain and Ireland, have invented certain new and useful Improvements in Processes for the Manufacture of Para-Amino-N-Methylformanilid, of which the following is a specification.

This invention relates to the manufacture of paranitro-N-methylformanilid

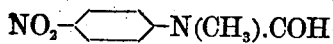

and paraamino-N-methylformanilid

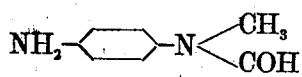

being new intermediate products suitable for the production of coloring matters.

I have found that these compounds are applicable with great advantage in the production of coloring matters as the formyl residue can be easily removed from coloring matters prepared therefrom.

The starting point in this invention is N-methylformanilid,

In carrying out the invention I nitrate the N-methylformanilid at moderately low temperatures with nitric acid, preferably in the presence of concentrated sulfuric acid. The product is isolated by pouring the nitration solution or mixture on to ice. It may be further purified by crystallization from organic solvents.

The paranitro-N-methylformanilid thus produced is converted into paraaminomethylformyl base by such reducing agents as convert the nitro-group into an amino-group without eliminating the formyl-group.

The para-amino-N-methylformanilid can be readily diazotized in the well known way and the diazonium salt can be combined with phenols, naphthols, amino-phenols, aminonaphthol or their sulfonic or carboxylic acids to give rise to formylated azo-derivatives which yield valuable coloring matters on removing the formyl group by hydrolysis.

The following examples may serve to illustrate how the invention may be carried out in practice. The parts are by weight.

*Example 1.*

One part of N-methylformanilid is dissolved in three parts of cold concentrated sulfuric acid, and a mixture of one part of nitric acid of specific gravity 1.42 with an equal volume of concentrated sulfuric acid is slowly added to this solution while it is being stirred, care being taken that the temperature does not rise above 18° C. The product is isolated by pouring this mixture on to ice, collecting the precipitated crude para-nitro-N-methylformanilid on a filter and washing it thoroughly with cold water. The crude product may either be used direct as described in the next example or purified by crystallization from alcohol or benzene from which it is obtained in transparent, pale yellow obliquely truncated prisms melting at 119° to 120° centigrade.

From concentrated solutions this nitro-compound separates in acicular crystals having the same melting point.

*Example 2.*

Ten parts of para-nitro-N-methylformanilid are suspended in 50 parts of hot water containing one part of formic acid and reduced on the water bath with ten parts of iron borings added little by little so that the reaction proceeds smoothly. The para-amino-N-methylformanilid dissolves in the hot liquid. The stirring is continued until all the nitro-compound has disappeared. The iron present in the solution is precipitated with ten parts of powdered calcium carbonate and removed from the hot solution by filtration. The para-amino-N-methylformanilid crystallizes from the filtrate on cooling and is colletced on a filter. A further amount of this base is obtained by concentration of the filtrate. The crude base is purified by recrystallization from water or alcohol or benzene; it then crystallizes in almost colorless needles melting at 115° to 116° centigrade.

What I claim and desire to secure by Letters Patent is:—

1. Process for the manufacture of para-nitro-N-methyl formanilid comprising nitrating N-methyl formanilid, substantially as described.

2. Process for the manufacture of para amino-N-methyl formanilid, comprising nitrating N-methyl formanilid and reducing the resulting para-nitro-N-methyl formanilid in such manner as not to eliminate the formyl group, substantially as described.

3. Process for the manufacture of para-amino-N-methyl formanilid, comprising reducing para-nitro-N-methyl formanilid in such manner as not to eliminate the formyl group, substantially as described.

4. As a new product, para amino-N-methyl formanilid, soluble in water, alcohol or benzene and melting at 115° to 116° C.

In testimony whereof I have signed my name to this specification in the presence of two subscribing witnesses.

GILBERT THOMAS MORGAN.

Witnesses:
 LUCY ETHEL SANDERS,
 ROBERT MILTON SPEARPOINT.